United States Patent [19]

Itoh et al.

[11] Patent Number: 4,669,688
[45] Date of Patent: Jun. 2, 1987

[54] CABLE CLAMP

[75] Inventors: Kenkichi Itoh, Kobe; Takao Matsui; Toshio Murakami, both of Osaka, all of Japan

[73] Assignee: Kitagawa Industries Co., Ltd., Nagoya, Japan

[21] Appl. No.: 803,980

[22] Filed: Dec. 3, 1985

[30] Foreign Application Priority Data

Feb. 7, 1985 [JP] Japan ............... 60-16424[U]

[51] Int. Cl.⁴ .............................. F16L 3/08
[52] U.S. Cl. .................. 248/74.2; 24/16 PB; 24/297; 24/543; 248/71; 248/68.1; 248/74.3
[58] Field of Search ........... 248/74.2, 74.1, 74.3, 248/74.4, 74.5, 71, 73, 68.1, 49, 316.1, 316.5, 316.7; 24/297, 293, 289, 16 PB

[56] References Cited

U.S. PATENT DOCUMENTS

| | | | |
|---|---|---|---|
| 3,423,055 | 1/1969 | Fisher | 248/73 |
| 3,515,363 | 6/1970 | Fisher | 248/71 |
| 3,516,631 | 6/1970 | Santucci | 248/71 |
| 3,529,795 | 9/1970 | Van Niel | 24/16 PB X |
| 3,823,443 | 7/1974 | Takabayashi | 24/487 X |
| 3,854,482 | 12/1974 | Laugherty et al. | 24/543 X |
| 3,901,480 | 8/1975 | Basile et al. | 24/543 X |
| 4,143,577 | 3/1979 | Eberhardt | 248/71 X |
| 4,356,599 | 11/1982 | Larson et al. | 24/16 PB |
| 4,439,896 | 4/1984 | Matsui | 24/16 PB |
| 4,440,374 | 4/1984 | Achille | 248/74.2 X |
| 4,455,715 | 6/1984 | Matsui | 24/16 PB |
| 4,457,482 | 7/1984 | Kitagawa | 248/73 X |
| 4,564,163 | 1/1986 | Barnett | 248/16 PB X |
| 4,566,660 | 1/1986 | Anscher et al. | 248/74.2 |
| 4,609,171 | 9/1986 | Matsui | 248/68.1 X |

FOREIGN PATENT DOCUMENTS

| | | | |
|---|---|---|---|
| 1522441 | 4/1968 | France | 24/487 |
| 1541448 | 2/1979 | United Kingdom | 174/138 D |

Primary Examiner—Ramon O. Ramirez
Attorney, Agent, or Firm—Oblon, Fisher, Spivak, McClelland, & Maier

[57] ABSTRACT

A cable clamp of the present invention comprises a base having a fixing portion on the lower surface, a flat clamp rockingly connected to the base, and a means for locking a distal end of the flat clamp to the base engageably or disengageably. The cable clamp retains electric wires between the base and the flat clamp. The locking member comprises a plate-shaped protrusion provided on the flat clamp or the base and a retaining protrusion formed with the outer surface thereof. A resilient retaining member is protrudingly provided on the flat clamp opposite the plate-shaped protrusion or the base and has a hole for engaging with the retaining protrusion. An engaging member is protrudingly provided on the same surface with the resilient retaining member in parallel and engaging with an inner surface of the plate-shaped protrusion. Further, a notched portion formed with a distal end of the resilient retaining member faces the engaging member. Therefore, the cable clamp can easily carry out unlocking without any unlock levers and offers not only a simple but a secure locking mechanism.

6 Claims, 9 Drawing Figures

CABLE CLAMP

BACKGROUND OF THE INVENTION

1. Technological Field:

The present invention relates to a cable clamp which holds a plurality of electric wires and fixes them onto chassis, printed circuit boards, etc. of electric machinery.

2. Prior Art:

The cable clamps which hold a plurality of electric wires and fix them onto chassis, printed circuit boards of electric machinery have been known.

These kinds of cable clamps have the constitution so that holes for running electric wires are formed to retain a plurality of electric wires. In addition, the holes are provided with the locking portion which can be engaged or disengaged. When the electric wires are run through the holes, the locking portion is released to open, thereafter, form the holes for the wires. And the opening is formed to facilitate the work when the wires are run. Then, the opening is closed to retain the wires securely by the locking portion after the wires are run.

Also, in the conventional cable clamps, the locking portion comprises a hook formed with one end of the opening, an engaging hook and a side wall formed with the other end of the opening. Locking and unlocking are made easier by protrudingly providing an unlock lever outside the engaging hook end.

But, there is a problem with the conventional cable clamps. Namely, its locking portion is easily unlocked when a flat clamp having said hook is protrudingly moved in preset direction or said unlock lever extending outward is hit by something. It is possible to prevent the flat clamp from moving in preset direction by forming a notch and a protrusion fit into the notch on the hook and the engaging hook respectively. But the problem will be left unsolved as far as said unlock lever extending outward is continually used as a part of the locking portion.

OBJECTS OF THE INVENTION

It is one objective of the present invention to provide a cable clamp with the locking portion capable of not only being released without any unlock levers but locking simply and securely.

Another objective of the present invention is to provide a cable clamp capable of holding electrical wires firmly without the release of the locking portion by vibrations, impacts, etc. A plate-shaped protrusion is fit into a retaining groove formed with a resilient retaining piece and an engaging piece, and a retaining hook on the protrusion is fit into a hole in the locked state.

A further objective of the present invention is to provide a cable clamp wherein a notched portion of a resilient retaining piece is pulled out by fingertips, etc. so as to release a retaining hook from the hole easily in the unlocked state, such a work being facilitated.

SUMMARY OF THE INVENTION

In order to achieve the above-mentioned objectives thereby to solve the aforementioned prior art problems, the cable clamp comprises:

a base having a fixing portion on the lower surface, a flat clamp being rockingly connected to the base, and means for locking a distal end of the flat clamp to the base engageably or disengageably.

The cable clamp holds electric wires between the base and the flat clamp.

The locking portion comprises:

a plate-shaped protrusion provided on the flat clamp or the base, wherein a retaining hook is formed with an outer surface, a resilient retaining piece protrudingly provided on the flat clamp opposite the plate-shaped protrusion or the base and having a hole for engaging with the retaining hook, and an engaging piece protrudingly provided on the same surface with the resilient retaining piece in parallel and engaging with an inner surface of the plate-shaped protrusion.

In addition, another feature of the cable clamp is that a notched portion is formed with a fore end of the resilient retaining piece facing to the engaging piece.

The notched portion is formed by cutting the fore end of the resilient retaining piece facing to the engaging piece. It is provided so as to make the release of the lock easy. The retaining hook comes out of the hole by pulling out the portion with fingertips, etc. when the lock is released.

Providing the above-mentioned constitution to the present invention, the retaining hook is fit into the hole of the resilient retaining piece and the plate-shaped protrusion where the retaining hook is formed with is firmly fit into the retaining groove formed with the resilient retaining piece and engaging piece in the locked state. Also, in the unlocked state, the lock is easily released merely by pulling out the notched portion formed with the fore end of the resilient retaining piece.

DETAILED DESCRIPTION OF THE PREFERRED EMBODIMENT

One embodiment of the present invention will be described with reference to FIGS. 1-8.

Figure 1:
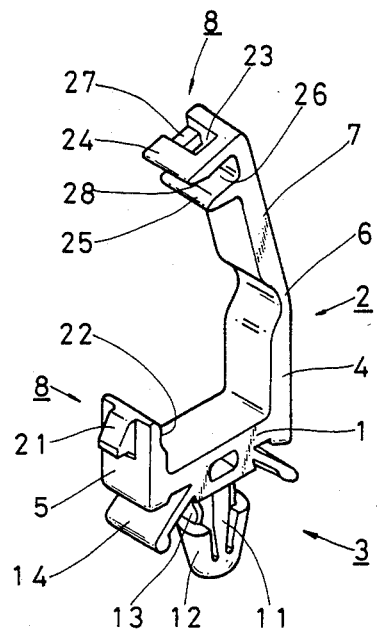
FIG. 1 is a perspective side view of a cable clamp in accordance with the present invention as a whole.
Figure 2:
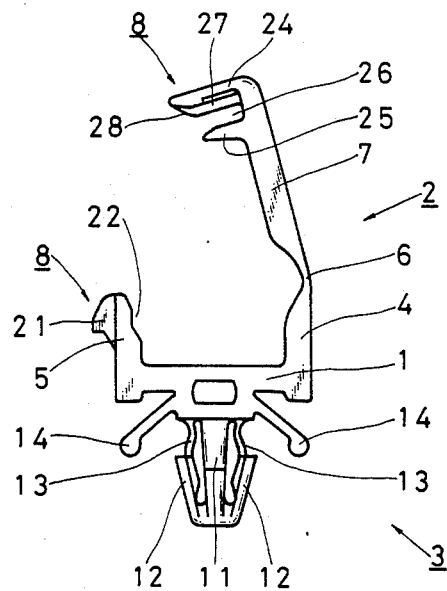
FIG. 2 is a front view thereof.
Figure 3:
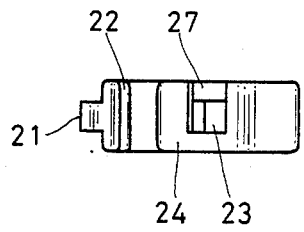
Fig. 3 is a plan view thereof.
Figure 5:
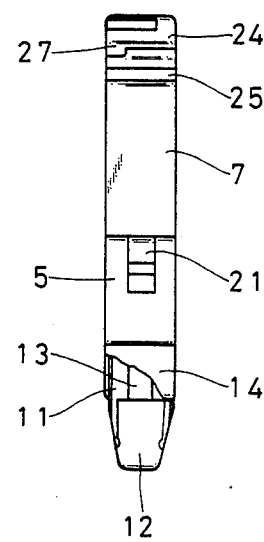
FIG. 5 is a left side view with a part broken away.
Figure 4:
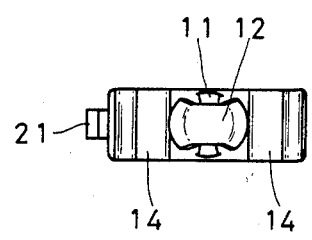
FIG. 4 is a bottom view thereof.
Figure 6:
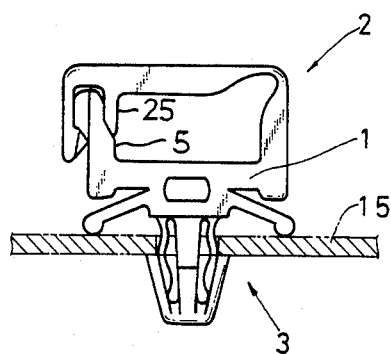
FIG. 6 is a front view showing an installation condition onto a printed circuit board.
Figure 7:
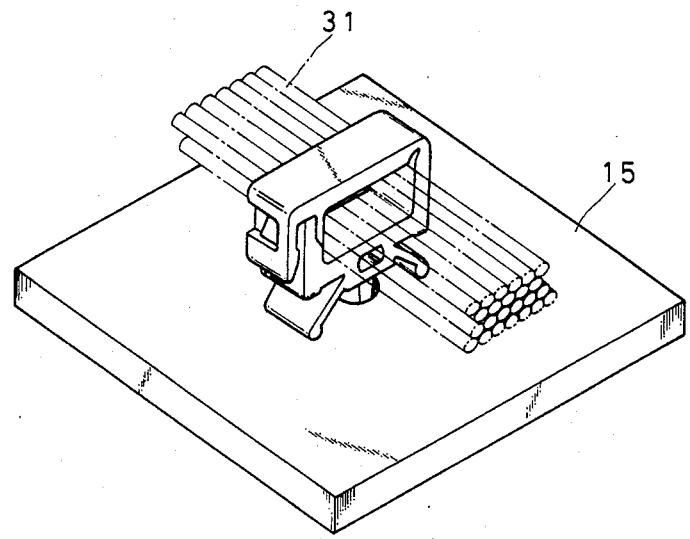
FIG. 7 is a perspective view of FIG. 6.
Figure 8A:
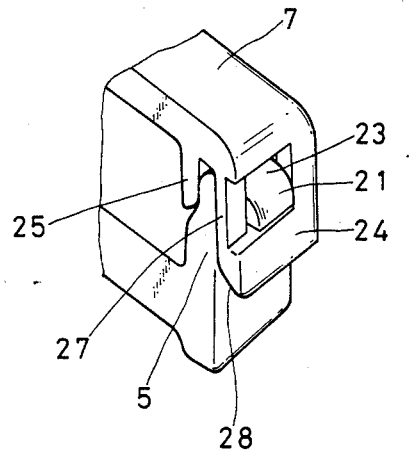
FIGS. 8(A) and 8(B) are enlarged perspective views showing a locking portion.
Figure 8B:
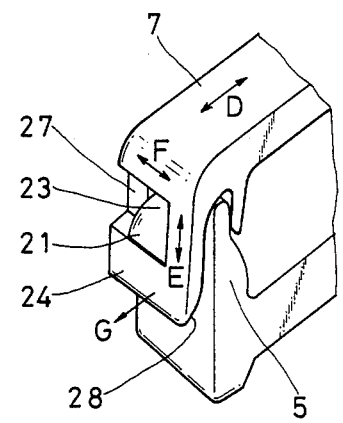

FIGS. 1 and 8 show one embodiment of the present invention. FIG. 1 is a perspective view as a whole, FIGS. 2 through 5 are a front view, a flat view, a bottom view and a left side view with a part broken away respectively. FIG. 6 is a front view showing an installation condition onto a printed circuit board. FIG. 7 is a perspective view of FIG. 6. FIGS. 8(A) and 8(B) are enlarged perspective views showing a locking portion.

As shown in the figures, the present invention comprises a base 1, a clamp 2 for electric wires formed with the surface of the base 1, and a fixing portion 3 formed with the lower surface of the base 1 and for fixing the cable clamp onto a printed circuit board. The above-mentioned portions are integrally formed of a synthetic resin.

The clamp 2 for electric wires comprises two plate-shaped protrusions 4 and 5 projectingly provided on both ends of the base 1, a flat clamp 7 rockingly connected to an upper end of the plate-shaped protrusion 4 through a thin connecting portion 6. A pair of locking portion 8 is portion 8 are formed with the end portions of the plate-shaped protrusion 5 and the flat clamp 7.

The fixing portion 3 comprises a supporting protrusion 11 extending downward from the lower surface of the base 1, a V-shaped resilient piece 12 with its arrowhead fore ends extending upward from the right and left ends of the supporting protrusion 11, a pair of connecting pieces 13 elastically formed so as to connect both right and left fore ends of the resilient piece 12 with the portion adjacent to the base of the supporting protrusion 11 on the base 1, and a pair of resilient flaps 14 biasingly provided downward right and left near the base of the supporting protrusion 11. As shown in FIG. 6, when the cable clamp of the present invention is installed onto a printed circuit board 15, the resilient piece 12 and the resilient flaps 14 hold the printed circuit board 15 securely, and the cable clamp is fit onto the board firmly.

Secondly, the locking one of portions 8 comprises a retaining member 21 protrudingly formed with the outer surface of the plate-shaped protrusion 5, and a notched portion 22 formed in the inner surface of the plate-shaped protrusion 5 like cut from the fore end thereof. The other one of the locking portions 8 comprises resilient retaining member 24 provided inward on the fore end of the flat clamp 7 and having a hole 23 for engaging with the retaining member 21 and an engaging member 25 protrudingly provided on the flat clamp 7 in parallel with the resilient retaining member 24 at a predetermined interval therefrom. In the locked state, the plate-shaped protrusion 5 is fit into a retaining groove 26 constituted by the resilient retaining member 24 and the engaging member 25, the retaining member 21 is caught in the hole 23, and the outer surface of the engaging member 25 comes in direct contact with the notched portion 22.

Additionally, a stepped portion 27 is protrudingly formed with one end of the inner surface of the hole 23 provided in the resilient retaining member 24 so as to guide the retaining member 21 into the hole 23 in the locked state. The outer surface of the stepped portion 27 is formed concave so as not to damage the resilience in this embodiment. A notched portion 28 is chippingly formed with the fore end of the inside of the resilient retaining member 24. Thus, the lock can be easily released by pulling out the notched portion 28 with fingertips.

In the cable clamp of this embodiment constituted as above, when the locking portions 8 are locked by pushing down the flat clamp 7 after inserting electric wires, the working efficiency is improved by the stepped portion 27 which guides the retaining member 21 into the hole 23. Also, the finish of locking is easily confirmed by the knock of the plate-shaped protrusion 5 on the surface. The knock occurs as the outer surface of the stepped portion 27 is formed thin and concave.

As shown in FIGS. 6 and 7, the outer surface of the engaging member 25 touches the notched portion 22 formed in the plate-shaped protrusion 5 to fit the engaging member 25 into the notched portion 22, and there are substantially no gaps on the inner surface formed by the engaging member 25 and plate-shaped protrusion 5.

Therefore, there is no fear of the electric wires 31 being caught in the locked state.

Further, as shown in FIG. 8, when the flat clamp 7 is moved in arrow directions D, E and F respectively after locking, the flat clamp 7 is securely fixed onto the plate-shaped protrusion 5 by the locking portions 8, so the lock would not come off even if anything hits on the resilient retaining member 24. Also, the working efficiency is not reduced, as the retaining member 21 can be easily released from the hole 23 by pulling out the notched portion 28 of the resilient retaining member 24 with fingertips in arrow direction G in the unlocked state.

In the above-mentioned embodiment, the V-shaped resilient piece 12 and the resilient flaps 14 are used as the fixing portion. But anything will be acceptable if possible to fix the base onto the predetermined place such as chassis, printed circuit board, etc. For example, the adhesive may be applied to the base if the lower surface is flat.

In addition, the resilient retaining member 24 and the engaging member 25 are formed with the flat clamp 7, whereas the plate-shaped protrusion 5 having the retaining member 21 is formed with the surface of the base 1 in the above-mentioned embodiment. On the contrary, it will be allowed that the plate-shaped protrusion is formed with the flat clamp and the resilient retaining member and the engaging member are provided on the base at a predetermined interval.

Moreover, in the above-mentioned embodiment, the flat clamp 7 is provided on the upper end of the plate-shaped protrusion 4 on the base 1 via the connecting portion 6 so as to be rockingly movable on the base. But it would be proper to form the flat clamp thinly and install it onto the upper end of the plate-shaped protrusion on the base or the base directly. In this case, it is possible to hold electric wires more securely by changing the shape of the hole.

What is claimed is:

1. A cable clamp comprising:
   (a) a base having an upper surface, a lower surface, and a fixing portion on its lower surface;
   (b) a flat clamp rockingly connected to said base; and
   (c) a pair of locking members, said pair of locking members locking a distal end of said flat clamp to an end portion of said base engageably or disengageably, in use retaining electric wires between said base and said flat clamp in the locked state, said pair of locking members comprising:
   (i) a plate-shaped protrusion provided on said flat clamp or said base, said plate-shaped protrusion having an inner surface and an outer surface;
   (ii) a retaining member formed on the outer surface of said plate-shaped protrusion;
   (iii) a resilient retaining member protrudingly provided on the other of said flat clamp or said base opposite said plate-shaped protrusion, said resilient retaining member having a hole for engaging said retaining member;
   (iv) an engaging member protrudingly provided on said the other of said flat clamp or said base in parallel to said resilient retaining member, said engaging member being sized, shaped, and positioned to make planar contact with the inner surface of said plate-shaped protrusion in the locked state; and
   (v) a notched portion formed on the distal end of said resilient retaining member, said notched portion being sized, shaped, and positioned so that it can be manipulated manually to disengage said retaining member from said hole in said resilient member.

2. A cable clamp as set forth in Claim 1, wherein said resilient retaining member has a stepped portion for guiding said retaining member into said hole.

3. A cable clamp as set forth in claim 1, wherein said base and said flat clamp are connected via a thinner connecting portion.

4. A cable clamp as set forth in Claim 1, wherein said resilient retaining member extends longer than said engaging member.

5. A cable clamp as set forth in claim 1, wherein a notched portion is formed in the inner portion of said plate-shaped protrusion and said engaging member is sized, shaped, and positioned to mate with said notched portion.

6. A cable clamp as set forth in claim 1, wherein a surface of said retaining member engages said notched portion formed on the distal end of said resilient retaining member and slidingly locks it to the surface thereof.

* * * * *

UNITED STATES PATENT AND TRADEMARK OFFICE
CERTIFICATE OF CORRECTION

PATENT NO. : 4,669,688
DATED : June 2, 1987
INVENTOR(S) : Haruyuki Sugiura

It is certified that error appears in the above-identified patent and that said Letters Patent is hereby corrected as shown below:

On the Title Page, Item [19], "Itoh et al." should read -- Sugiura --.

Item [75], should read -- [75] Inventor: Haruyuki

Sugiura, Kariya, Japan --.

Signed and Sealed this

Thirteenth Day of October, 1987

Attest:

DONALD J. QUIGG

Attesting Officer

Commissioner of Patents and Trademarks